United States Patent
Karame et al.

(10) Patent No.: US 11,748,472 B2
(45) Date of Patent: Sep. 5, 2023

(54) TRUSTED SERVICE FOR DETECTING ATTACKS ON TRUSTED EXECUTION ENVIRONMENTS

(71) Applicant: NEC Laboratories Europe GmbH, Heidelberg (DE)

(72) Inventors: Ghassan Karame, Heidelberg (DE); Claudio Soriente, Madrid (ES)

(73) Assignee: NEC CORPORATION, Tokyo (JP)

( * ) Notice: Subject to any disclaimer, the term of this patent is extended or adjusted under 35 U.S.C. 154(b) by 278 days.

(21) Appl. No.: 17/009,791

(22) Filed: Sep. 2, 2020

(65) Prior Publication Data

US 2022/0067150 A1    Mar. 3, 2022

(51) Int. Cl.
    *G06F 21/55* (2013.01)
    *G06F 21/57* (2013.01)

(52) U.S. Cl.
    CPC ............ *G06F 21/552* (2013.01); *G06F 21/57* (2013.01); *G06F 2221/031* (2013.01); *G06F 2221/034* (2013.01)

(58) Field of Classification Search
    CPC .. G06F 21/552; G06F 21/57; G06F 2221/031; G06F 2221/034; G06F 21/53
    See application file for complete search history.

(56) References Cited

U.S. PATENT DOCUMENTS

| 9,064,099 | B2 | 6/2015 | Horning et al. |
| 10,397,005 | B2 | 8/2019 | Brickell |
| 2012/0159184 | A1 | 6/2012 | Johnson et al. |
| 2018/0157558 | A1* | 6/2018 | Karame ................. G06F 11/07 |
| 2018/0212966 | A1* | 7/2018 | Costa .................. H04L 63/0435 |
| 2019/0102546 | A1 | 4/2019 | Cheng et al. |
| 2020/0067922 | A1* | 2/2020 | Avetisov ................ H04L 63/18 |

FOREIGN PATENT DOCUMENTS

WO    WO 2016/195880 A1    12/2016

OTHER PUBLICATIONS

Oleksenko, Oleksii, Bohdan Trach, Robert Krahn, Mark Silberstein, Christof Fetzer, "Varys: Protecting SGX enclaves from practical side-channel attacks," Usenix ATC'18, Jul. 11-13, 2018, Boston, MA, USA.

Chen, Sanchuan, Xiaokuan Zhang, Michael K. Reiter, Yinqian Zhang, "Detecting privileged side-channel attacks in shielded execution with déjà vu," AsiaCCS'17, Apr. 2-6, 2017, Abu Dhabi, United Arab Emirates.

Shih, Ming-Wei, Sangho Lee, Taesoo Kim, Marcus Peinado, T-SGX: Eradicating controlled-channel attacks against enclave programs, NDSS'17, Feb. 26-Mar. 1, 2017, San Diego, CA USA.

Dhar, Aritra et al. "ProximiTEE: Hardened SGX Attestation by Proximity Verification," CODASPY'20, Mar. 16-18, 2020, New Orleans, LA, USA, ACM.

(Continued)

*Primary Examiner* — Beemnet W Dada
(74) *Attorney, Agent, or Firm* — Leydig, Voit & Mayer, Ltd.

(57) ABSTRACT

A method for providing a trusted service to a trusted execution environment running on a remote host machine includes receiving a message from the trusted execution environment and incrementing a counter of the trusted service. A response message is sent to the trusted execution environment using a value of the incremented counter.

15 Claims, 4 Drawing Sheets

(56) References Cited

OTHER PUBLICATIONS

Matetic, Sinisa, "Security with Intel SGX: Enhancements, Applications and Privacy," Doctoral Thesis, ETH Library, Dec. 2018.
Intel, "Platform Service Enclave and ME For Intel Xeon Server," Mar. 20, 2019.
Van Bulck, Jo et al. "SGX-Step: A Practical Attack Framework for Precise Enclave Execution Control," SysTEX'17, Oct. 2017, Shanghai, China.
Sun, Haonan et al. "eTPM: A Trusted Cloud Platform Enclave TPM Scheme Based on Intel SGX Technology," Sensors 2018, 18, 3807, Nov. 6, 2018.
Noubir, Guevara and Amirali Sanatinia, "Trusted Code Execution on Untrusted Platforms Using Intel SGX," Virus Bulletin Conference, Oct. 2016.
Alder, Fritz et al. "Migrating SGX Enclaves with Persistent State," arXiv:1803.11021v1, Mar. 29, 2018.
Krawiecka, Klaudia et al. "SafeKeeper: Protecting Web Passwords using Trusted Execution Environments," arXiv: 1709.01261v2, Apr. 23, 2018.
Moghimi, Ahmad, "Side-Channel Attacks on Intel SGX: How SGX Amplifies The Power of Cache Attack," Masters Theses (All Theses, All Years), 399, Worcester Polytechnic Institute Digital WPI, Apr. 27, 2017.
Pires, Rafael Pereira, "Distributed systems and trusted execution environments: Trade-offs and challenges," arXiv:2001.09670v3, Mar. 11, 2020.

* cited by examiner

TRUSTED SERVICE FOR DETECTING ATTACKS ON TRUSTED EXECUTION ENVIRONMENTS

FIELD

The present invention relates to a method, system and computer-readable medium for providing a trusted service for detecting attacks on trusted execution environments (TEEs).

BACKGROUND

TEEs enable applications to run in isolation from other software running on the same platform. Nevertheless, TEEs are susceptible to a number of attacks aimed at leaking secrets (e.g., cryptographic keys) of the TEEs due to the resources shared with the other software on the same host machine (e.g., cache). Most of these attacks can be exposed by detecting anomalies in the application performance in terms of, e.g., cache-misses or page-faults (see Oleksii Oleksenko, Bohdan Trach, Robert Krahn, Mark Silberstein and Christof Fetzer, "Varys: Protecting SGX enclaves from practical sidechannel attacks," Usenix ATC (2018); Sanchuan Chen, Xiaokuan Zhang, Michael K. Reiter and Yinqian Zhang, "Detecting privileged side-channel attacks in shielded execution with déjà vu," AsiaCCS (2017); and Ming-Wei Shih, Sangho Lee, Taesoo Kim and Marcus Peinado, "T-sgx: Eradicating controlled-channel attacks against enclave programs," NDSS (2017), each of which is hereby incorporated by reference herein). This is because most attacks that exploit side-channels alter the application performance with respect to an execution in a benign environment.

SUMMARY

In an embodiment, the present invention provides a method for providing a trusted service to a trusted execution environment running on a remote host machine. The method includes receiving a message from the trusted execution environment and incrementing a counter of the trusted service. A response message is sent to the trusted execution environment using a value of the incremented counter.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Embodiments of the present invention provide TEEs with one or more trusted services that are either not available or handled by the untrusted Operating System (OS). In particular, an embodiment of the present invention enables a TEE application to keep track of the number of times it was invoked and/or to obtain time-related information by using an external service that can be instantiated either as a centralized server or a distributed, fault-tolerant service. Thus, the present invention provides for the ability to provide a "health status monitor" service for TEEs that allows the TEEs to reliably monitor their performance in order to evaluate the risk of being under attack. In particular, TEEs are enabled by interacting with such a service to keep track of execution time and number of restarts.

One example of a TEE is INTEL SGX, which provides functions such as isolation, sealing and attestation. The TEE in INTEL SGX is referred to as an enclave. The term "enclave" is also used herein to generally refer to a TEE and such description should not be understood as being limited to INTEL SGX, but rather applicable to all TEEs.

Surprisingly, the inventors have discovered that enclave secrets can be leaked without the ability to detect the attack through performance monitoring. In particular, the inventors have discovered that, if an adversary can restart the victim at will, it can spread the attack across a large number of executions of the victim and leak the secret without significant impact on the victim performance. Thus, available detection tools are no longer effective.

In an embodiment, the present invention provides a method for providing a trusted service to a trusted execution environment running on a remote host machine. The method includes receiving a message from the trusted execution environment and incrementing a counter of the trusted service. A response message is sent to the trusted execution environment using a value of the incremented counter.

In an embodiment, the message received from the trusted execution environment includes a random nonce and was sent upon a restart of the trusted execution environment.

In an embodiment, the response message to the trusted execution environment includes the random nonce such that security of a channel of communication between the trusted execution environment and the trusted service is determinable.

In an embodiment, the response message to the trusted execution environment includes the value of the incremented counter such that a number of restarts of the trusted execution environment is determinable by the trusted execution environment using the value of the incremented counter of the trusted service.

In an embodiment, the method further comprises comparing the value of the incremented counter of the trusted service to a predetermined threshold, wherein the response message to the trusted execution environment includes instructions to continue or halt execution based on whether the value of the incremented counter of the trusted service is above or below the threshold.

In an embodiment, the message received from the trusted execution environment includes a result of a pseudo-random function calculated by the trusted execution environment and was sent upon a restart of the trusted execution environment, the pseudo-random function using a shared secret established with the trusted execution environment.

In an embodiment, the response message to the trusted execution environment includes a result of the pseudo-random function calculated by the trusted service such that security of a channel of communication between the trusted execution environment and the trusted service is determinable by comparing the results of the pseudo-random function.

In an embodiment, the result of the pseudo-random function in the message received from the trusted execution environment is dependent on a value of a counter of the trusted execution environment, and the result of the pseudo-random function in the response message to the trusted execution environment is dependent on the value of the incremented counter of the trusted service such that a number of restarts of the trusted execution environment is determinable by the trusted execution environment using the value of the incremented counter and such that the value of the counter of the trusted execution environment is incrementable together with the incremented counter of the trusted service.

In an embodiment, the method further comprises comparing the value of the incremented counter of the trusted service to a predetermined threshold, wherein the response message to the trusted execution environment includes instructions to continue or halt execution based on whether the value of the incremented counter of the trusted is above or below the threshold.

In an embodiment, the method further comprises measuring a period of time between receiving the message from the trusted execution environment and receiving a previous message from the trusted execution environment, wherein the incrementing of the value of the counter of the trusted service is based on a determination that the measured period of time lies in an interval that complies, within a tolerance threshold, with a periodicity for sending messages established with the trusted execution environment and a round-trip-time for the messages.

In an embodiment, the response message is an indication to the trusted execution that the periodicity has been complied with such that relative times of a clock source of the host machine are checkable for accuracy by the trusted execution environment using the computation of the trusted service.

In an embodiment, the message received from the trusted execution environment includes a result of a pseudo-random function calculated by the trusted execution environment, the pseudo-random function using a shared secret established with the trusted execution environment. The response message to the trusted execution environment includes a result of the pseudo-random function calculated by the trusted service such that security of a channel of communication between the trusted execution environment and the trusted service is determinable by comparing the results of the pseudo-random function.

In an embodiment, the method further comprises setting up an authenticated communication channel between the TEE and the trusted service, for example, using a certified public key of the trusted service.

In another embodiment, the present invention provides a system for providing a trusted service to a trusted execution environment running on a remote host machine, the system comprising one or more processors which, alone or in combination, are configured to provide for execution of a method according to an embodiment of the present invention.

In a further embodiment, the present invention provides a tangible, non-transitory computer-readable medium having instructions thereon which, upon being executed by one or more processors, alone or in combination, provide for execution of a method according to an embodiment of the present invention.

Figure 1:
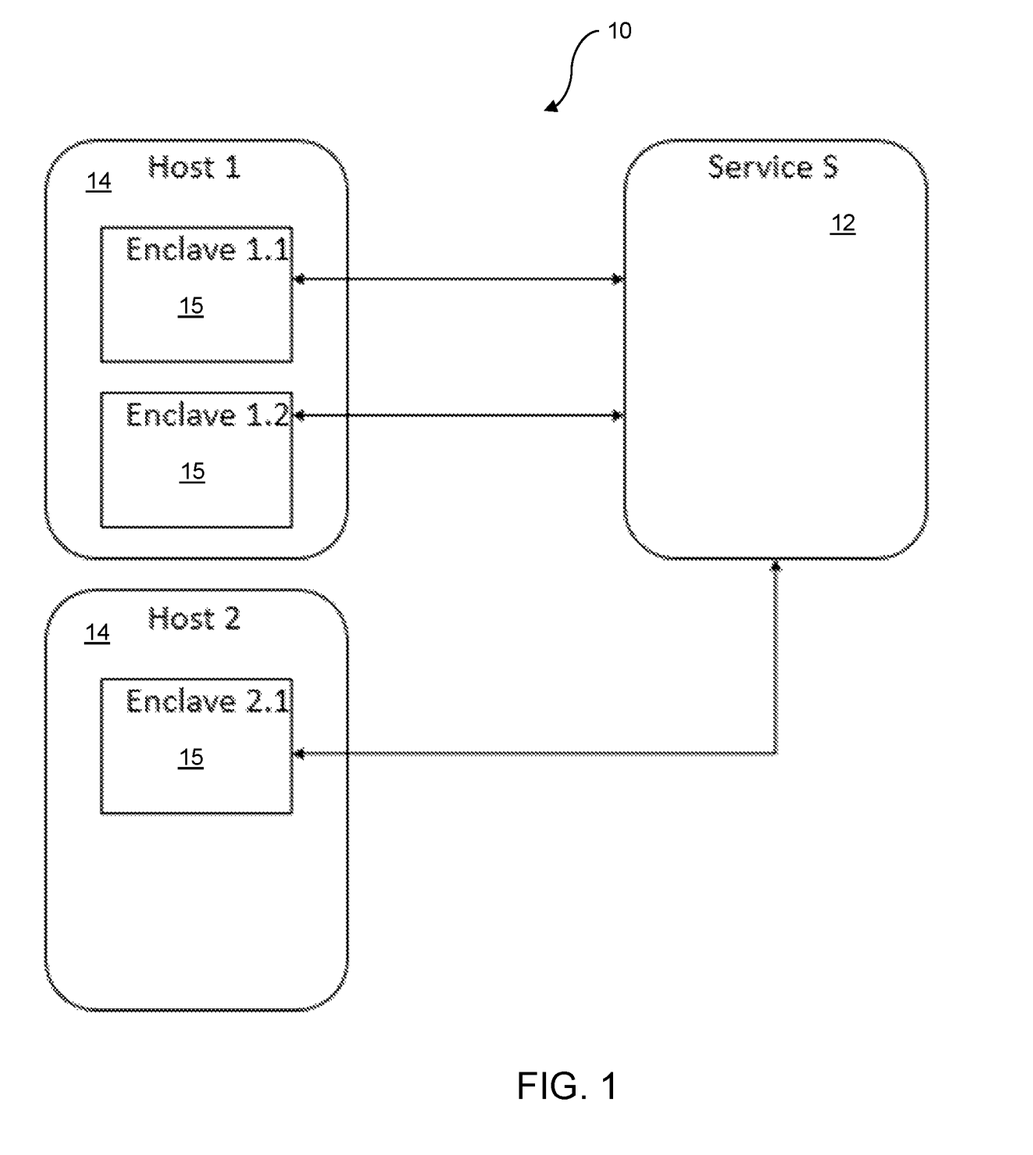
FIG. 1 schematically illustrates a system architecture for providing TEEs with a trusted service according to an embodiment of the present invention.

FIG. 1 schematically illustrates the architecture of a system 10 for providing a trusted service S for monitoring TEEs 15 (enclaves 1.1, 1.2 and 2.1) running on two different host machines 14 (Host 1 and Host 2). The trusted service S can be implemented, for example, by software running on a central server 12 with one or more hardware processors implementing code of the software stored on a tangible, non-transitory computer-readable medium. Embodiments of the present invention assume a set of TEEs 15, that may or may not run on the same host machine 14. The trusted service S can operate on the central server 12, or can be instantiated using a plurality of computing devices or nodes by a decentralized/distributed layer (e.g., running a consistent Byzantine fault tolerant (BFT) layer). In the latter decentralized/distributed system, available computational resources of different machines can be distributed and used more efficiently, while also providing fault tolerance to the machines providing the service. Communication between a TEE 15 and the trusted service S, for example, running on the central server 12, occurs over a secure (e.g., confidential and authenticated) channel established by means of certified public keys. In particular, the TEEs 15 have knowledge of the genuine public key of the trusted service S. Further, upon reception of a message from the trusted service S, the TEE 15 which receives the message checks message integrity and authenticity before processing its content. Likewise, upon reception of a message from one of the TEEs, the trusted service S which receives the message checks message integrity and authenticity before processing its content. For example, the secure channel can be realized using encryption and authentication keys as described above and the entity receiving the message can check message integrity and authenticity based on the encryption and using the authentication keys.

Embodiments of the present invention address an attacker model for TEEs, such as in INTEL SGX where enclaves run on a potentially malicious host machine. As such, a host machine, which controls the communication between the TEE and the outside world, can act as an adversary and may fabricate, replay or delay messages. Further, a host machine acting as an adversary can (re)start, pause or stop the trusted execution environment at will. The ultimate goal of such a host machine acting as an adversary in this scenario is to mount a side-channel attack against the victim TEE to extract the secrets of the TEE. Towards this end, the adversary host machine may restart the TEE multiple times or arbitrarily pause the TEE to mount an attack.

The trusted service S monitors and, if necessary, acts based on the monitored health status of the remote TEEs. As discussed below, examples of "health status" could include the number of restarts exhibited by a given TEE, or the total execution time of a given function.

When monitoring the health status, embodiments of the present invention provide two possible modes of operation for the trusted service S as follows:

Passive mode: In this operation mode, the trusted service S acts merely as an oracle for each of the TEEs. Preferably, the TEE embeds the necessary logic to act upon the health information provided by trusted service S. For example, the trusted service S could simply count the number of restarts that a given TEE has undergone, but it remains the role of the TEE itself to analyze the significance of this information for its security and operation.

Active mode: In this operation mode, the trusted service S not only monitors the health of each TEE, but also possesses enough knowledge to determine if there is any serious violation/threat on the TEE based on the monitored health status. For example, the trusted service S can monitor the number of restarts of a given TEE, use such information to determine the risk of the TEE being under attack and inform that TEE accordingly.

In doing so, the trusted service S acts as a powerful tool to protect TEEs from attacks they cannot detect by themselves and empowers TEEs with knowledge that they have no access to. Such a trusted service S can provide important security measures to almost all platforms/applications that leverage TEEs for confidential computing. This is particularly advantageous, for example, in cloud-based applications that leverage TEEs.

The code of the application running in the TEE is modified to communicate with the trusted server using the secure communication channel. The code of the application running on the TEE is also modified in different embodiments of the present invention discussed below, for example, in order for the TEE to draw a random nonce on a restart, communicate with the trusted service to agree on details of a pseudo-random function to be used on restarts and/or a periodicity for sending messages, to increment a counter, to write and read counter values to and from local storage, to check messages received from the trusted service, such as to check that a random nonce received from the trusted service S matches the random nonce drawn by the TEE or to check results of the agreed-upon pseudo-random function, to measure or receive from the trusted service a round-trip time for communications, etc. In the passive mode of embodiments of the present invention, the code of the application running in the TEE is modified to use the information provided by the trusted service to determine whether to halt execution. For example, the code of the application running in the TEE could be modified to check a number of restarts against a predetermined threshold, and halt execution if the number of restarts exceeds this threshold. In the active mode of embodiments of the present invention, the code of the application running in the TEE is modified to implement instructions received by the trusted service S.

It is recognized in the present invention that implementation of the trusted service S has to overcome certain challenges unique to the computing architecture used in applications using TEEs. For example, since the input/output (I/O) interface of a TEE is controlled by the untrusted OS of the host machine on which the TEE is running, the OS could try to modify messages exchanges, manipulate their order, replay older messages, arbitrarily delay messages, etc. Thus, according to embodiments of the present invention, the trusted service S is designed to resist such attacks. In particular, embodiments of the present invention ensure that an adversary host machine cannot fabricate, replay, or delay messages.

Figure 2:
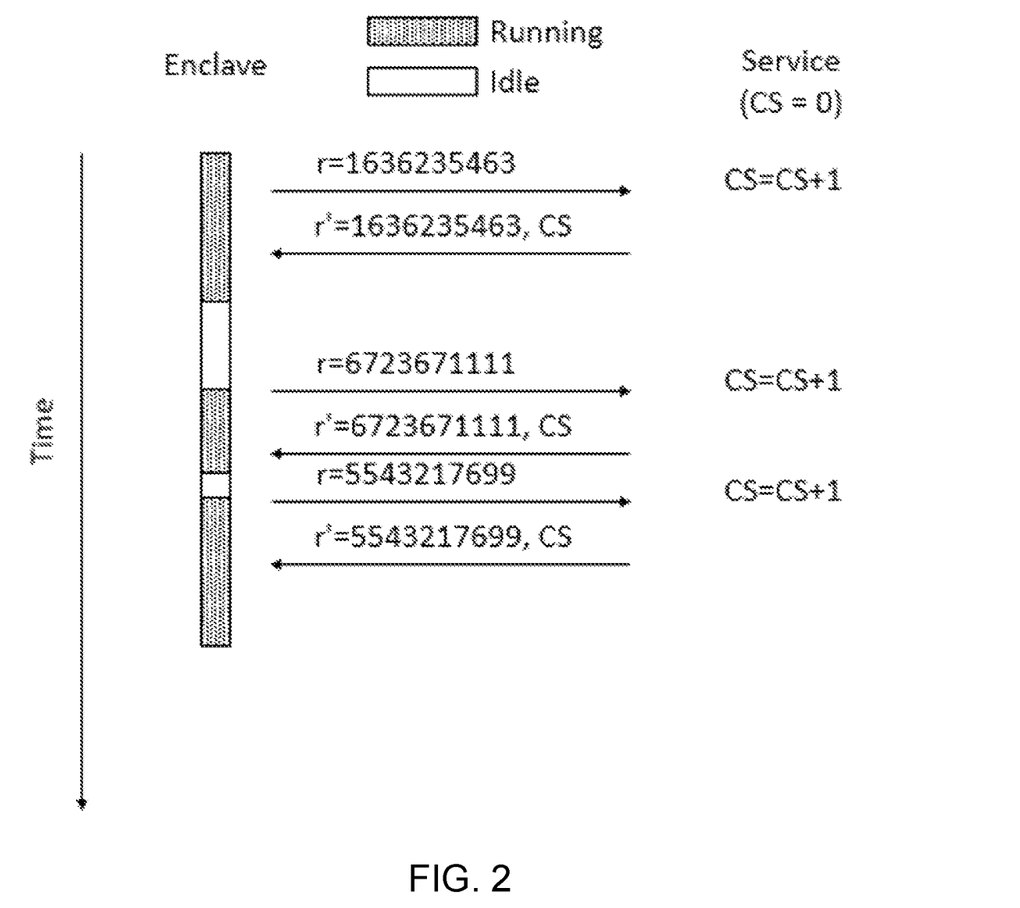
FIG. 2 schematically illustrates a method and communication protocol for monitoring a number of times a TEE has been restarted according to an embodiment of the present invention.

In an embodiment of the present invention, the trusted service S measures the number of restarts of a monitored TEE. The inventors have recognized that TEEs are vulnerable to stealthy, fine-grained controlled-channel attacks, where a malicious OS of a host machine can leak one bit of the secret at each run of the victim TEE. Such attacks are rooted in the ability of the host machine as an attacker to restart the victim TEE, so as to leak one bit per run and eventually recover the full secret. This type of attack cannot be detected using existing detection techniques that monitor performance metrics of the TEE (e.g., cache misses, page-faults, etc.). To be able to detect this type of attack, the system model described above is instantiated with the specific goal of enabling the machine(s) running the trusted service S, such as a central server, to reliably count the number of times a victim TEE was restarted. A setup phase is used to establish a secure channel between the TEE and the trusted service S. At the end of the setup phase, the trusted service S stores a counter CS initialized to 0. The trusted service S can then provide the following modes of operation:

Passive mode: Operations in passive mode are depicted in FIG. 2. Upon a restart, the TEE draws a random nonce r and sends message [r] to the trusted service S. Upon reception of the message, the trusted service S sets the counter CS=CS+1, and r'=r, and replies to the TEE with message [r',CS]. Upon reception of the message [r',CS], the TEE checks that the received r' in the message matches the random nonce r as sent in the previous message. The use of a random nonce r advantageously helps to avoid replay attacks. If the two values match, the TEE concludes that it has been restarted the number of times indicated by the counter CS; otherwise, the TEE concludes that an external party has tampered with the communication channel towards the trusted service S.

Active mode: Upon restart, the TEE draws a random nonce r and sends message [r] to the trusted service S. Upon reception of the message, the trusted service S sets the counter CS=CS+1, and r'=r. Next, the trusted service S decides, by using arbitrary logic, whether the TEE is at risk of attack. For example, the trusted service S could conclude that the TEE is at risk of attack if the current number of restarts indicated by the counter CS is higher than a given threshold. The threshold for the number of restarts can be application specific. For example, the extraction of a secret bitstring may require as little as one restart per secret bit, and therefore the threshold can be set accordingly to prevent leaking the entire secret bitstring. Finally, the trusted service S replies to the TEE with message [r',X] where X includes instructions for the TEE to follow. For example, X could be "ok" in case the TEE could continue the execution. Otherwise, X could be "halt" in case the TEE should halt its execution. Upon reception of the message, the TEE checks that the received r' matches the random nonce r as sent in the previous message. If the two values match, the TEE concludes that X was sent by trusted service S and it may act accordingly; otherwise, the TEE concludes that an external party has tampered with the communication channel towards the trusted service S.

Figure 3:
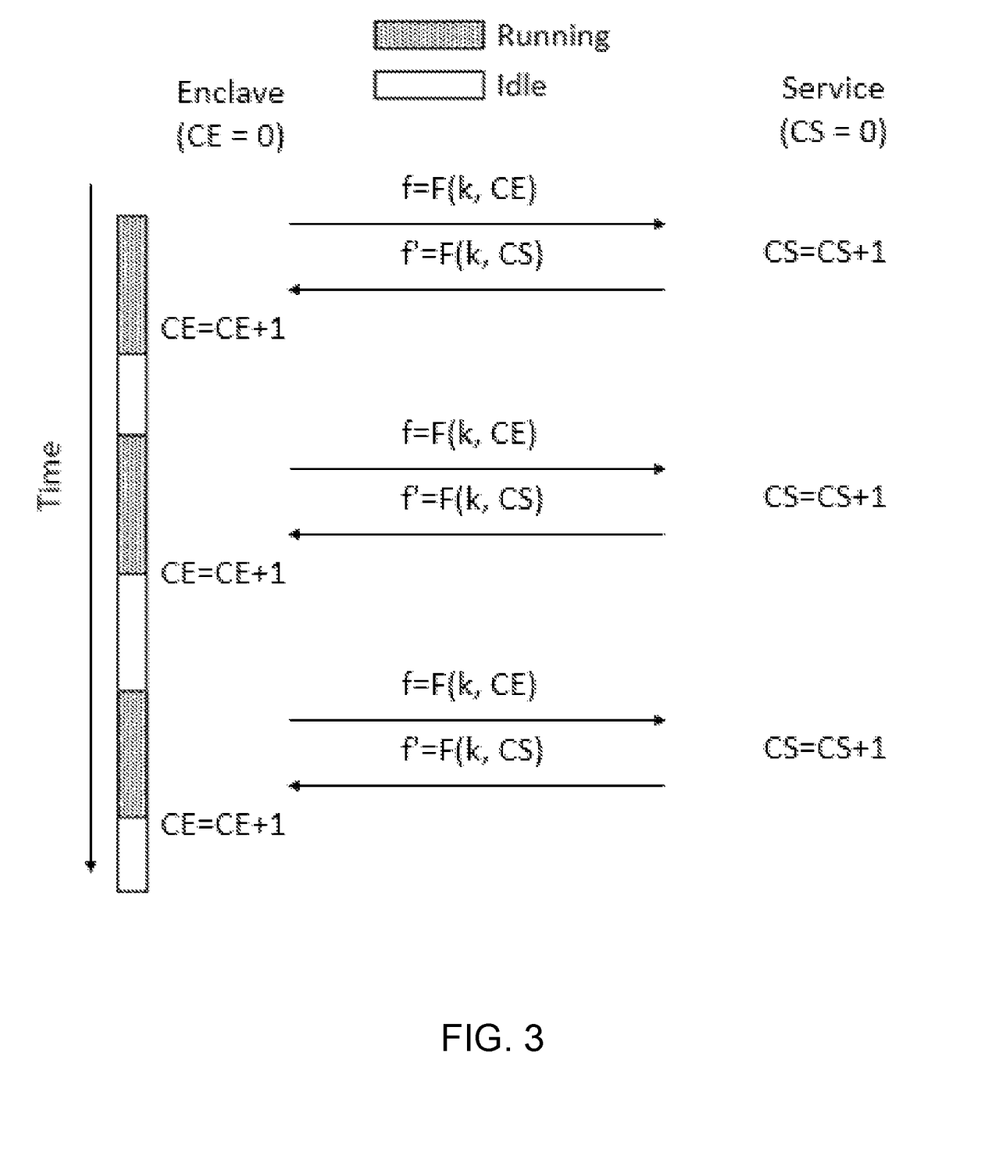
FIG. 3 schematically illustrates a method and communication protocol for monitoring a number of times a TEE has been restarted according to another embodiment of the present invention.

In an embodiment of the present invention, the trusted service S can also measure the number of restarts of a monitored TEE when there is no source of randomness (e.g., in a case where the TEE does not have access to a secure source of randomness). In this case, the protocol is amended to account for this. During setup, the TEE and the trusted service S additionally establish a shared secret k and agree on the details of a pseudo-random function F. Also, the TEE initializes a counter CE to 0. The counter CE is stored on local storage to persist across restarts and therefore, handled by the untrusted OS. The trusted service S can then provide the following modes of operation:

Passive mode: Operations in passive mode are depicted in FIG. 3. Upon restart, the TEE retrieves its counter CE and sends a message [f=F(k,CE,0)] to the trusted service S. The inclusion of the counter CE in addition to the counter CS ensures that both parties have the same value of the counter. The inclusion of the values 0,1 help to avoid replay attacks. For example, messages with 0 are outgoing from the TEE to the service (so they are not accepted as incoming messages by the TEE), and messages with 1 are outgoing from the trusted service to the TEE (so they are not accepted as incoming messages by the service). Upon reception of the message, the trusted service S checks that the received f matches F(k,CS,0). If so, the trusted service S sets the counter CS=CS+1 and replies to the TEE with a message [f=F(k,CS,1)]. Upon reception of the message, the TEE checks that the received f matches F(k,CE+1,1). If so, the TEE sets CE=CE+1, writes it to local storage, and concludes that it has been restarted CE times; otherwise, the TEE concludes that an external party has tampered with the communication channel towards the trusted service S or that information retrieved from the local storage was manipulated.

Active mode: Upon restart, the TEE retrieves its counter CE and sends message [f=F(k,CE,0)] to the trusted service S. Upon reception of the message, the trusted service S checks that the received f matches F(k,CS,0). If so, the trusted service S sets the counter CS=CS+1. Next, the trusted service S decides, by using arbitrary logic, whether the TEE is at risk of attack. For example, the trusted service S could conclude that the TEE is at risk of attack if the current number of restarts indicated by the counter CS is higher than a given threshold. Finally, the trusted service S replies to the TEE with message [f=F(k,CS,1),X] where X includes instructions for the TEE to follow. For example, X could be "ok" in case the TEE could continue the execution. Otherwise, X could be "halt" in case the TEE should halt its execution. Upon reception of the message from the trusted service S, the TEE checks that the received f' matches F(k,CE+1,1). If so, the TEE sets the counter CE=CE+1, writes it to local storage, and concludes that X as received in the message was sent by the trusted service S and it may act accordingly; otherwise, the TEE concludes that an external party has tampered with the communication channel towards the trusted service S or that information retrieved from the local storage was manipulated.

Figure 4:
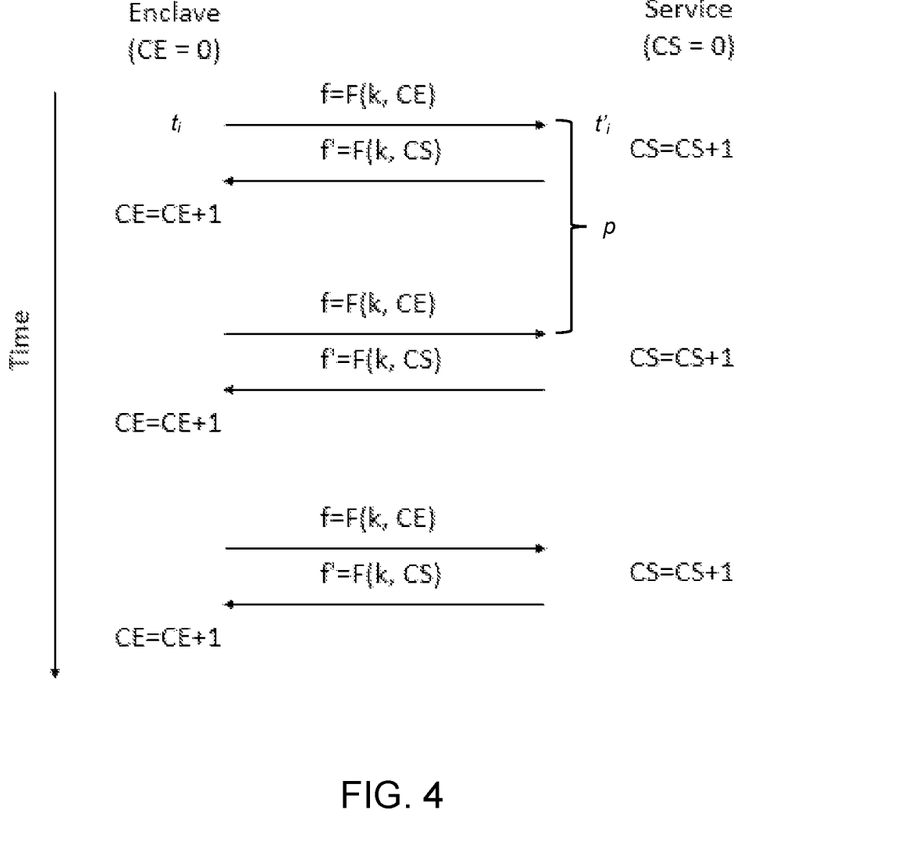
FIG. 4 schematically illustrates a method and communication protocol for providing a trusted clock service to a TEE according to an embodiment of the present invention.

In an embodiment of the present invention, the trusted service S can act as a trusted external clock service for the TEE. In this embodiment, the trusted service S acts a source of time for TEEs. It is known that TEEs such as INTEL SGX lack a reliable source of time as the application programming interface (API) that allows TEEs to obtain timing information is handled by a potentially malicious OS. Accordingly, the trusted service S enables TEEs to obtain relative time information (e.g., time elapsed since the start of the execution). During a setup phase, the TEE and the trusted service S establish a shared secret k and agree on the details of a pseudo-random function F. Finally, the TEE and the trusted service S agree on a periodicity p, depending on the granularity of the time-related information required by the TEE, and on the round-trip-time rtt between the TEE and the trusted service S. For example, one or both of the TEE and the trusted service S measure the rtt, or it is known in advance. At the end of setup, both the TEE and the trusted service S initialize a counter to 0. Referring to FIG. 4, the counter CE is the counter of the TEE and the counter CS is the counter of the trusted service S. As in the embodiment described above, the counter CE is meant to persist across restarts, so it is stored on local storage and therefore handled by the untrusted OS. After setup, the protocol is divided into rounds and operations are depicted in FIG. 3. A round starts every p seconds according to the time provided by the OS to the TEE. At the start of round i, for example at time the TEE retrieves its counter CE and sends a message to the trusted service S that includes $f_i$=F(k,CE,0). Upon reception of the message at time $t'_i$, the trusted service S checks that $f_i$ as received in the message matches F(k,CS,0). Further, the trusted service S checks that the difference between $t'_i$ and $t'_{i-1}$ (i.e., the time when the previous messages from the same TEE was received) lies in the interval [p+rtt/2+d,p+rtt/2−d], where d is a tolerance threshold. In this case, the trusted service S computes the counter CS=CS+1 and replies to the TEE with a message including $f'_i$=F(k,CS,1). Upon reception of the message, the TEE checks that the received $f'_i$ as received matches F(k,CE+1,1). If so, the TEE sets its counter CE=CE+1, writes it to local storage, and concludes that the time information provided by the OS at the beginning of round i was genuine. Otherwise, the TEE concludes that such timing information was not genuine. In this embodiment, the use of the rtt advantageously helps to allow to detect whether the OS is delaying messages.

Embodiments of the present invention provide for one or more of the following improvements:

Using an interactive challenge-response protocol with a trusted third party by means of an authenticated channel and random nonces and/or an agreed upon pseudo-random function to reliably count the number of restarts of SGX enclaves and to prevent any other party to fabricate or replay messages.

Using an interactive challenge-response protocol with a trusted third party by means of an authenticated channel, random nonces and/or an agreed upon pseudo-random function, and a pre-defined message frequency to reliably track elapsed time and to prevent any other party to fabricate, replay or delay messages.

Providing functionalities to TEEs, such as INTEL SGX enclaves, that they currently do not have access to in cloud-based deployments by instantiating a trusted server that implements counters on behalf of TEE applications and/or allows TEE applications to detect frequent restarts for detection of a side-channel attack.

In an embodiment, the present invention provides a method for providing a trusted service to a trusted execution environment, the method comprising:

Upon restart, the application TEE running on a host machine draws a random nonce r and sends r to the trusted service running on a server.

Upon reception of the message from the TEE, the server increases its own counter value and replies with the same random nonce r and with the new counter value.

Upon reception of the message from the server, the TEE checks that the received nonce matches what the TEE sent to the server in the previous message. If the two values match, the TEE concludes that it has been restarted as many times as it has been reported by the server; otherwise the TEE concludes that an external party has tampered with the process.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for providing a trusted service to a trusted execution environment running on a remote host machine, the method comprising:
    receiving, by the trusted service, a message from the trusted execution environment that was sent upon a restart of the trusted execution environment;
    incrementing a counter of the trusted service, which is running on a different machine than the remote host machine; and
    sending a response message to the trusted execution environment using a value of the incremented counter, wherein the trusted execution environment uses the value of the incremented counter to determine whether the remote host machine has been rebooted.

2. The method as recited in claim 1, wherein the message received from the trusted execution environment includes a random nonce.

3. The method according to claim 2, wherein the response message to the trusted execution environment includes the random nonce such that security of a channel of communication between the trusted execution environment and the trusted service is determinable.

4. The method according to claim 3, wherein the response message to the trusted execution environment includes the value of the incremented counter such that a number of restarts of the trusted execution environment is determinable by the trusted execution environment using the value of the incremented counter of the trusted service.

5. The method as recited in claim 3, further comprising comparing the value of the incremented counter of the trusted service to a predetermined threshold, wherein the response message to the trusted execution environment includes instructions to continue or halt execution based on whether the value of the incremented counter of the trusted service is above or below the threshold.

6. The message as recited in claim 1, wherein the message received from the trusted execution environment includes a result of a pseudo-random function calculated by the trusted execution environment, the pseudo-random function using a shared secret established with the trusted execution environment.

7. The method according to claim 6, wherein the response message to the trusted execution environment includes a result of the pseudo-random function calculated by the trusted service such that security of a channel of communication between the trusted execution environment and the trusted service is determinable by comparing the results of the pseudo-random function.

8. The method according to claim 7, wherein the result of the pseudo-random function in the message received from the trusted execution environment is dependent on a value of a counter of the trusted execution environment, and wherein the result of the pseudo-random function in the response message to the trusted execution environment is dependent on the value of the incremented counter of the trusted service such that a number of restarts of the trusted execution environment is determinable by the trusted execution environment using the value of the incremented counter and such that the value of the counter of the trusted execution environment is incrementable together with the incremented counter of the trusted service.

9. The method as recited in claim 7, further comprising comparing the value of the incremented counter of the trusted service to a predetermined threshold, wherein the response message to the trusted execution environment includes instructions to continue or halt execution based on whether the value of the incremented counter of the trusted is above or below the threshold.

10. The method as recited in claim 1, further comprising measuring a period of time between receiving the message from the trusted execution environment and receiving a previous message from the trusted execution environment, wherein the incrementing of the value of the counter of the trusted service is based on a determination that the measured period of time lies in an interval that complies, within a tolerance threshold, with a periodicity for sending messages established with the trusted execution environment and a round-trip-time for the messages.

11. The method as recited in claim 10, wherein the response message is an indication to the trusted execution environment that the periodicity has been complied with such that relative times of a clock source of the host machine are checkable for accuracy by the trusted execution environment using the computation of the trusted service.

12. The method as recited in claim 11, wherein the message received from the trusted execution environment includes a result of a pseudo-random function calculated by the trusted execution environment, the pseudo-random function using a shared secret established with the trusted execution environment, and wherein the response message to the trusted execution environment includes a result of the pseudo-random function calculated by the trusted service such that security of a channel of communication between the trusted execution environment and the trusted service is determinable by comparing the results of the pseudo-random function.

13. The method as recited in claim 1, further comprising setting up an authenticated communication channel between the trusted execution environment and the trusted service.

14. A system for providing a trusted service to a trusted execution environment running on a remote host machine, the system comprising one or more processors which, alone or in combination, are configured to provide for execution of the following steps:

receiving, by the trusted service, a message from the trusted execution environment that was sent upon a restart of the trusted execution environment;

incrementing a counter of the trusted service, which is running on a different machine than the remote host machine; and sending a response message to the trusted execution environment using a value of the incremented counter, wherein the trusted execution environment uses the value of the incremented counter to determine whether the remote host machine has been rebooted.

15. A tangible, non-transitory computer-readable medium having instructions thereon which, upon being executed by one or more processors, alone or in combination, provide for execution of the following steps:

receiving, by the trusted service, a message from the trusted execution environment that was sent upon a restart of the trusted execution environment;

incrementing a counter of the trusted service, which is running on a different machine than the remote host machine; and sending a response message to the trusted execution environment using a value of the incremented counter, wherein the trusted execution environment uses the value of the incremented counter to determine whether the remote host machine has been rebooted.

\* \* \* \* \*